(12) United States Patent
Buechler et al.

(10) Patent No.: US 10,430,875 B2
(45) Date of Patent: Oct. 1, 2019

(54) INTEGRATION AND ENHANCEMENT OF BUSINESS SYSTEMS WITH EXTERNAL SERVICES

(71) Applicant: Dun & Bradstreet Emerging Businesses Corp., Malibu, CA (US)

(72) Inventors: Chad Michael Buechler, Los Angeles, CA (US); Moujan Kazerani, Santa Monica, CA (US); Jeffrey M. Stibel, Malibu, CA (US); Aaron B. Stibel, Hidden Hills, CA (US)

(73) Assignee: DUN & BRADSTREET EMERGING BUSINESSES CORP., Malibu, CA (US)

( * ) Notice: Subject to any disclaimer, the term of this patent is extended or adjusted under 35 U.S.C. 154(b) by 0 days.

(21) Appl. No.: 15/226,673

(22) Filed: Aug. 2, 2016

(65) Prior Publication Data
US 2018/0040063 A1  Feb. 8, 2018

(51) Int. Cl.
*G06Q 40/00* (2012.01)
*G06Q 40/02* (2012.01)
(Continued)

(52) U.S. Cl.
CPC ........... *G06Q 40/025* (2013.01); *G06Q 20/10* (2013.01); *G06Q 20/4016* (2013.01)

(58) Field of Classification Search
CPC ... G06Q 40/025; G06Q 20/10; G06Q 20/4016
(Continued)

(56) References Cited

U.S. PATENT DOCUMENTS 6,119,103 A * 9/2000 Basch ............... G06Q 20/341
   705/35
6,535,856 B1 * 3/2003 Tal ..................... G06Q 30/04
   705/26.1
(Continued)

OTHER PUBLICATIONS

Experian information solutions, inc.; patent issued for system and method for outputting a credit risk report based on debit data. (Apr. 23, 2014). Journal of Engineering Retrieved from https://dialog.proquest.com/professional/docview/1885744231?accountid=142257 on May 17, 2019 (Year: 2014).*

(Continued)

*Primary Examiner* — Kito R Robinson
(74) *Attorney, Agent, or Firm* — Ohlandt, Greeley, Ruggiero & Perle, L.L.P.

(57) ABSTRACT

A system integration tool integrates an external service to run in conjunction with or as part of a remote business accounting system. The system integration tool includes a front-end component and a back-end component. The front-end component remotely accesses accounts receivable data from the accounting system. The back-end component merge each financial transaction within the accounts receivable data with a credit score of an entity associated with the financial transaction at a date associated with the financial transaction. The back-end component generates an external service that secures the accounting system against insecure financial transactions and embeds the external service to run as part of the accounting system. The external services alert the business as to insecure financial transactions that lead to bad debt or disqualify such transactions from entry into the accounting systems.

21 Claims, 9 Drawing Sheets

(51) Int. Cl.
*G06Q 20/10* (2012.01)
*G06Q 20/40* (2012.01)

(58) Field of Classification Search
USPC .......................................................... 705/38
See application file for complete search history.

(56) References Cited

U.S. PATENT DOCUMENTS

| | | | | |
|---|---|---|---|---|
| 7,970,676 B2* | 6/2011 | Feinstein | ............... | G06Q 20/10 |
| | | | | 705/35 |
| 8,381,120 B2* | 2/2013 | Stibel | ................. | G06Q 30/018 |
| | | | | 705/347 |
| 8,386,377 B1* | 2/2013 | Xiong | .................. | G06Q 20/04 |
| | | | | 455/550.1 |
| 8,447,686 B1* | 5/2013 | Wang | ................... | G06Q 40/025 |
| | | | | 705/35 |
| 8,655,773 B1* | 2/2014 | Fasoli | .................. | G06Q 40/00 |
| | | | | 705/38 |
| 8,805,737 B1* | 8/2014 | Chen | ...................... | G06Q 40/02 |
| | | | | 235/380 |
| 9,202,200 B2* | 12/2015 | Stibel | ................... | G06Q 10/101 |
| 9,485,265 B1* | 11/2016 | Saperstein | ........ | G06F 16/24575 |
| 10,282,718 B1* | 5/2019 | Lincoln | ................. | G06Q 20/12 |
| 2002/0077949 A1* | 6/2002 | Qasem | .................. | G06Q 40/02 |
| | | | | 705/36 R |
| 2002/0120559 A1* | 8/2002 | O'Mara | ................. | G06Q 40/00 |
| | | | | 705/38 |
| 2003/0229580 A1* | 12/2003 | Gass | ...................... | G06Q 30/02 |
| | | | | 705/38 |
| 2005/0044197 A1* | 2/2005 | Lai | ......................... | G06Q 10/10 |
| | | | | 709/223 |
| 2005/0288941 A1* | 12/2005 | DuBois | ............... | G06Q 30/018 |
| | | | | 705/317 |
| 2006/0136332 A1* | 6/2006 | Ziegler | ................... | G06F 21/31 |
| | | | | 705/39 |
| 2007/0138257 A1* | 6/2007 | Dragt | ..................... | G06Q 20/10 |
| | | | | 235/379 |
| 2008/0027860 A1* | 1/2008 | Mullen | ................. | G06Q 20/04 |
| | | | | 705/39 |
| 2008/0091578 A1* | 4/2008 | Kane | ...................... | G06Q 40/02 |
| | | | | 705/30 |
| 2008/0177655 A1* | 7/2008 | Zalik | ...................... | G06Q 40/02 |
| | | | | 705/38 |
| 2008/0262961 A1* | 10/2008 | Dellomo | ................. | G06Q 40/00 |
| | | | | 705/38 |
| 2009/0112752 A1* | 4/2009 | Milana | .................. | G06Q 20/40 |
| | | | | 705/38 |
| 2009/0248560 A1* | 10/2009 | Recce | .................... | G06Q 20/04 |
| | | | | 705/35 |
| 2010/0063914 A1* | 3/2010 | Lozano | .................. | G06Q 40/00 |
| | | | | 705/35 |
| 2010/0250411 A1 | 9/2010 | Ogrodski | | |
| 2011/0288996 A1* | 11/2011 | Kreutz | ................... | G06Q 20/40 |
| | | | | 705/44 |
| 2012/0109834 A1 | 5/2012 | Bongiovanni et al. | | |
| 2012/0130786 A1* | 5/2012 | Marshall | ................. | G06Q 40/02 |
| | | | | 705/14.17 |
| 2012/0173417 A1* | 7/2012 | Lohman | ............... | G06Q 20/102 |
| | | | | 705/40 |
| 2012/0209760 A1* | 8/2012 | McCarthy | ............ | G06Q 40/025 |
| | | | | 705/38 |
| 2012/0246048 A1* | 9/2012 | Cohen | .................... | G06Q 40/00 |
| | | | | 705/35 |
| 2012/0246060 A1* | 9/2012 | Conyack, Jr. | .......... | G06Q 40/02 |
| | | | | 705/38 |
| 2012/0278767 A1* | 11/2012 | Stibel | ..................... | G06Q 10/101 |
| | | | | 715/854 |
| 2012/0296804 A1* | 11/2012 | Stibel | ...................... | G06Q 40/02 |
| | | | | 705/38 |
| 2013/0185189 A1* | 7/2013 | Stewart | ................... | G06Q 40/02 |
| | | | | 705/38 |
| 2013/0297485 A1* | 11/2013 | Whitney | ................. | G06Q 40/02 |
| | | | | 705/38 |
| 2013/0297486 A1* | 11/2013 | Colborn | ................ | G06Q 40/02 |
| | | | | 705/38 |
| 2013/0311375 A1* | 11/2013 | Priebatsch | ............. | G06Q 30/06 |
| | | | | 705/44 |
| 2014/0258094 A1* | 9/2014 | Jouhikainen | ........... | G06Q 40/08 |
| | | | | 705/38 |
| 2014/0365356 A1* | 12/2014 | Gao | ...................... | G06Q 40/025 |
| | | | | 705/38 |
| 2017/0032460 A1* | 2/2017 | Szollar | .................. | G06Q 40/025 |
| 2017/0083973 A1* | 3/2017 | Robbins | ................ | G06Q 40/025 |
| 2017/0301013 A1* | 10/2017 | Alejo | .................. | G06F 21/6245 |

OTHER PUBLICATIONS

International Search Report dated Oct. 19, 2017 from corresponding International PCT Application PCT/US2017/045015, 3 pages.
Written Opinion dated Oct. 19, 2017 from corresponding International PCT Application PCT/US2017/045015, 11 pages.
International Preliminary Report on Patentability dated Aug. 9, 2018 from corresponding PCT International Application PCT/US2017/045015, 9 pages.

* cited by examiner

| | | | |
|---|---|---|---|
| 11-222-3333 | Acme Inc. | -$500 | 1/1/2015 |
| 12-345-5678 430 | ABC Store – 123 Main St. | -$1320 | 2/3/2015 |
| 00-111-2345 | 555-555-1234 | +$910 | 2/25/2015 |
| 99-888-7777 | Bill's Boutique; 555-123-1321; 777 A St. | -$399 | 4/5/2015 |
| 11-222-3456 | Acme Inc. | +$500 | 6/8/2015 |
| 56-789-1234 440 | ABC Store – 889 8$^{th}$ St. | -$2000 | 6/20/2015 |
| 12-345-5678 430 | ABC Store – P.O. Box 4342 | +$1320 | 7/14/2015 |
| 22-333-4444 | Joe's Service mail@joe.com | -$399 | 8/15/2015 |

410 → (row 2)
420 → (row 6)
450 → (row 7)

FIG. 4

INTEGRATION AND ENHANCEMENT OF BUSINESS SYSTEMS WITH EXTERNAL SERVICES

TECHNICAL FIELD

The present invention pertains to remote computer system access and integration of external services.

BACKGROUND

External service providers provide many of the services that businesses incorporate and use on daily basis. Accounting, inventory management, and logistical systems are typically obtained from external service providers as opposed to being developed in-house as custom proprietary systems. The reliance on external services allows businesses to immediately fill a void and do so with lower overall cost that custom developing each and every system put in use by the business.

However, many external services are created for general application. Accordingly, the external services provide a baseline set of functionality that does incorporate business specific information. The business specific information is typically not accessible because the business systems storing the business specific information are closed or were never designed for integration with these external services or external systems providing the services. The business can then incur the very overhead and expense it sought to avoid initially and customize the external services for their own business needs or customize their own internal systems to become compatible with the external services.

Risk management is one such example of an external service. Businesses obtain credit reports from credit reporting agencies such as Dun & Bradstreet®. The credit reports provide a risk assessment of different entities.

The businesses rely on the risk assessment of different entities provided in the credit reports in order to gain insight as to which entities a business should transact with and on what terms. In particular, each business generates a credit policy based on the credit reports. The credit policy guides the business in determining whether or not to assume the risk of transacting with an entity identified in a credit report. Businesses that perform a poor risk assessment as a result of misuse or underuse of credit report information or simple inexperience in performing a risk assessment can result in the business having to write off bad debt from transactions with entities that do not pay on time or at all.

If, however, the credit reporting agency had access to business specific information, the credit reporting agency could customize the credit reports to provide not only the risk assessment of different entities, but also a best practices selection of entities with which the business should transact with and specific transaction terms to minimize the business's risk. In other words, the external service provider could customize the service for each business and provide a significant value add.

Nearly every business has a bookkeeping or accounting system. These systems track financials of a given business including clients and transactions conducted with those clients. This business specific information, if made accessible to external service providers, could be used to customize the risk management services beyond simple credit reporting. In particular, providing access to this business specific information would enable external service providers to provide customized risk assessments and credit policies for a business for minimizing or eliminating bad debt.

There is therefore a need to access business systems in order to integrate business specific information from various business systems with systems of the external service providers. There is then a need to customize external services that are provided to a business based on the business specific information that is obtained from opening access to the various business systems.

BRIEF DESCRIPTION OF THE DRAWINGS

In order to achieve a better understanding of the nature of the present invention, a preferred embodiment will now be described, by way of example only, with reference to the accompanying drawings in which:

FIG. 4 illustrates an exemplary entity table obtained from accounting systems of a particular business that the back-end component merges with unique D-U-N-S identifiers from an external system in accordance with some embodiments.

DETAILED DESCRIPTION OF THE INVENTION

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

Some embodiments provide an integration tool for integrating and merging proprietary business systems with external third party controlled systems. The integration and merging produces new external services that are customized based on business specific information from the business systems. In some embodiments, the customized external services minimize or eliminate bad debt by generating credit policies that control or limit the transactions a business has with various entities.

Figure 1:
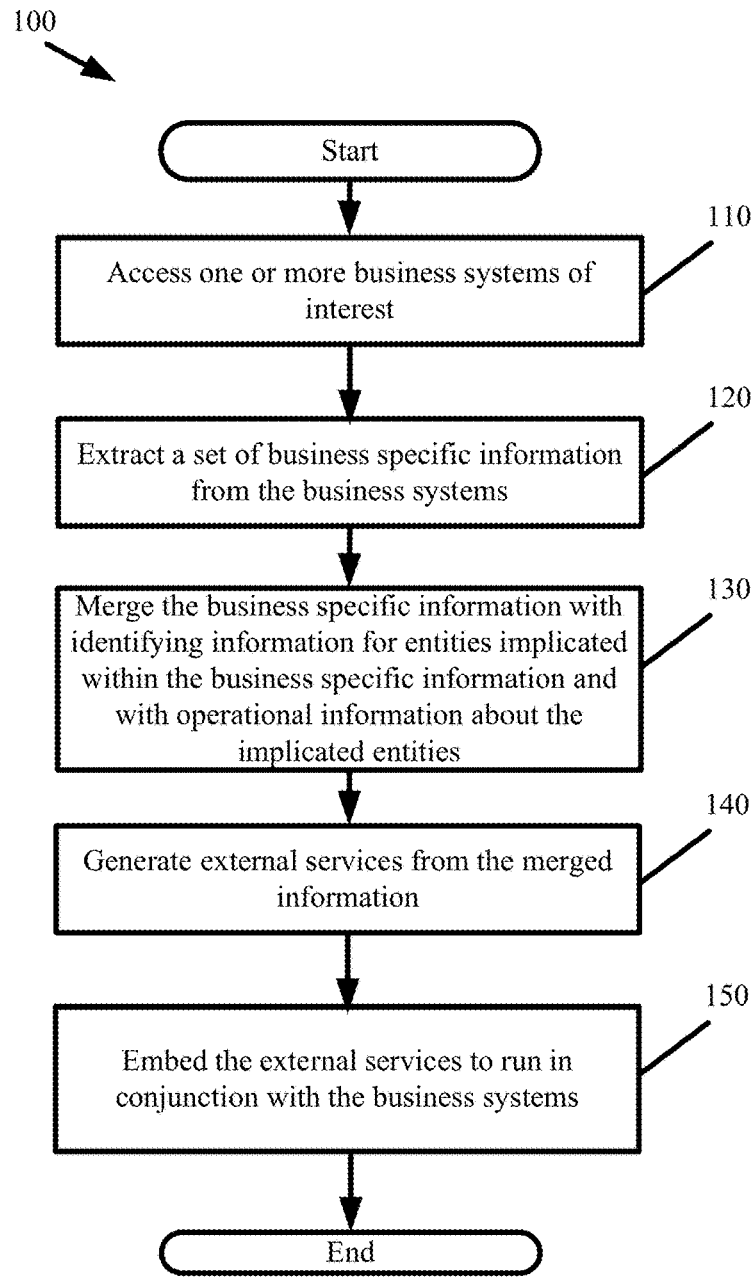
FIG. 1 presents an overview process for the integration and merging performed by the integration tool in accordance with some embodiments.

FIG. 1 presents an overview process 100 for the integration and merging performed by the integration tool in accordance with some embodiments. The integration tool remotely and securely accesses (at 110) one or more business systems of interest. These are systems that business employees or representatives have access to, but the outside world is unable to access due to the proprietary, confidential, or business specific nature of the information stored within the systems.

Preferred embodiments of the integration tool remotely access bookkeeping or accounting business systems. These systems include computers or machines on which accounting software executes. These systems can also include local databases or cloud based storage storing the files, databases, or other accounting records of the accounting systems. Examples of some accounting systems that can be remotely accessed by the embodiments described herein include Intuit Quickbooks and Sage.

The integration tool extracts (at 120) a set of business specific information from the business systems. Preferred embodiments of the integration tool extract accounts receivable and other financial information from the remotely accessed accounting systems.

The integration tool merges (at 130) the business specific information with identifying information for entities implicated within the business specific information and with operational information about the implicated entities. In some embodiments, the integration tool sources the identifying information and the operational information from one or more external systems that do not include the accessed business systems. In some embodiments, the integration tool merges the extracted information with historic credit information on entities that the integration tool identifies from the extracted information.

From the merging, the integration tool generates (at 140) and embeds (at 150) external services to run in connection with the business systems. In some embodiments, the integration tool embeds the external services as extensions off the business systems. The external services can then be triggered directly from the business systems based on normal usage of those systems.

In some embodiments, the external services secure the business systems and business operations connected to the business systems. In particular, the external services defend against insecure transactions. An insecure transaction can be a transaction that has resulted or will likely result in bad debt, a transaction with terms violating configured policies of the external services, a transaction between the business and an entity with an insufficient credit score (i.e., a credit score that does not satisfy a minimum threshold), or a transaction involving an entity having a poor payment history with the business, wherein the payment history is based on past indebtness, payment timeliness, past credit scores of the entities, or some combination thereof.

A particular application of the external services involves providing an early warning system. The early warning system generates alerts that identify potential or probable bad debt on the books of a particular business based on the merging of the accounts receivable information with the historic credit information. The early warning system can also restrict or prevent the business from continuing or entering into transactions that would trigger further alerts. The early warning system therefore guards the business from future financial harm.

In some embodiments, the external services implement credit policies to run in conjunction with the business accounting systems. The credit policies automatically qualify transactions with different entities as secure or as insecure before the transactions can mature into bad debt. The transaction qualification validates the transactional partners of the business. The validation restricts or prevents the business from entering into transactions or providing terms that violate the credit policies and that can lead to future financial harm. The validation therefore continually balances the business risk on behalf of the business and guides the business in finding suitable transactional partners.

Figure 2:
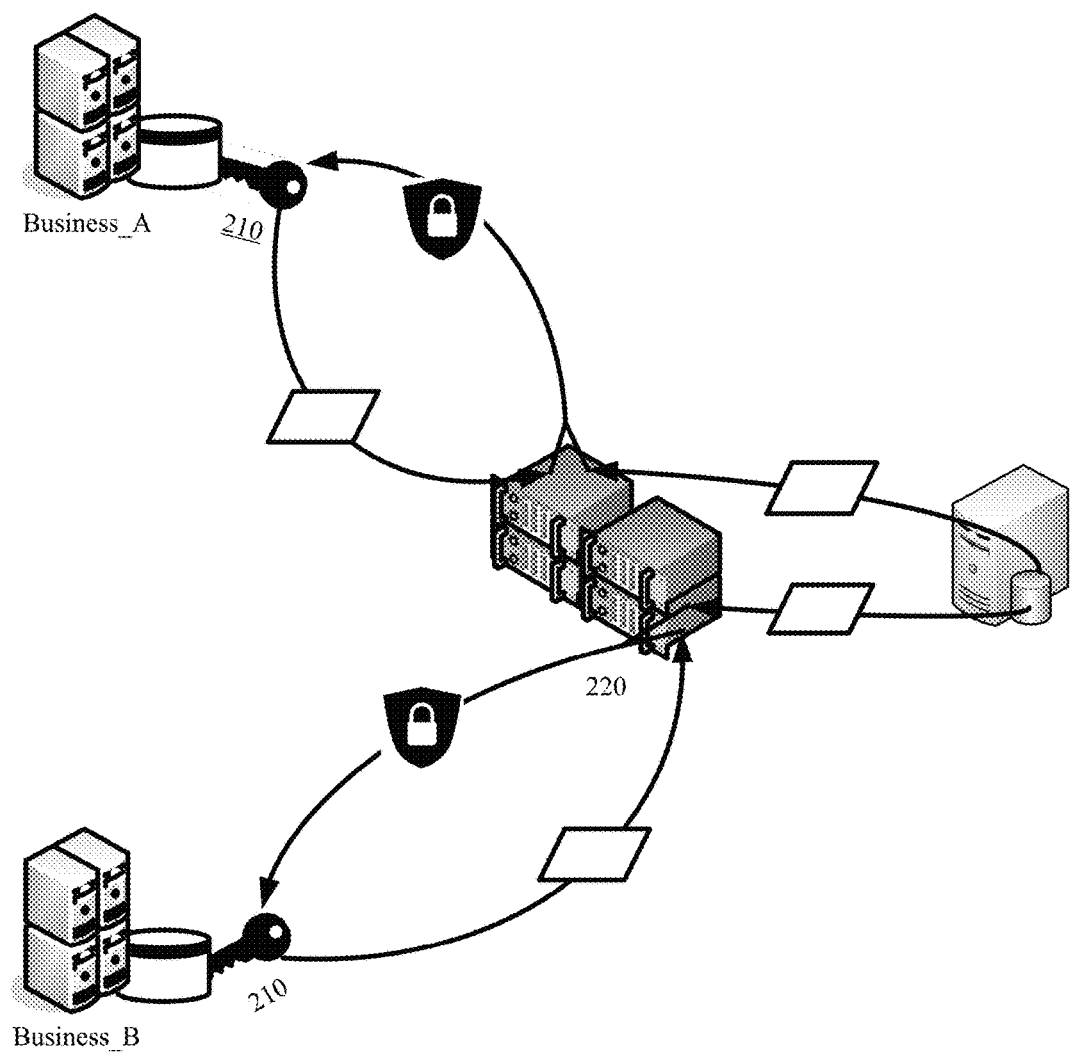
FIG. 2 conceptually illustrates the integration tool components and operations in accordance with some embodiments.

FIG. 2 conceptually illustrates the integration tool components and operations in accordance with some embodiments. The integration tool is implemented as a front-end component 210 and a back-end component 220.

A different instance of the front-end component 210 may be instantiated for accessing different business systems. The access opens the door through which the integration tool integrates and merges business specific information as part of the external services that secure business operations and financial transaction associated therewith. The access also allows the integration tool to embed the external services as part of the business systems and incorporate those services as part of the business's operations. The front-end component 210 can be implemented as a script, crawler, application programming interface (API), or other software.

The back-end component 220 is a network enabled machine or device that operates apart from the networks and machines on which the business systems run. The back-end component 220 directly interfaces with at least one front-end component 210. The back-end component 220 uses the access opened by the front-end component 210 to link the business systems with external systems that contain the supplemental data from which the external services for the businesses are produced. The back-end component 220 further uses the access opened by the front-end component 210 to embed the generated services back into the business systems so that the generated services can run alongside the existing services of the business systems.

Remote access into the business systems is initiated by business request and consent. A business submits a request to the back-end component for integration. The business may submit the request through a website, telephone call, or other remote means of contacting the back-end component. In response to the request, the back-end component sends a link to the business. The link can be provided in an email, text message, or website.

The business invokes the link in order to grant consent and permit the back-end component access to the business systems. As part of invoking the link, the business may enter credentials for accessing specific business systems. Invocation of the link instantiates front-end component operation.

In some embodiments, instantiation of the front-end component involves remotely accessing the business systems of interest over a network using secure networking protocols. In some embodiments, the front-end component issues a set of API calls using the business provided credentials. The API calls open access into the business systems, and specifically, to the files or databases storing the business specific information of interest. The API calls can also be used to extract the business specific information to the back-end component.

When API calls to the business systems are not available, invocation of the link may involve downloading a script, crawler, or other software onto the machines or network where the business systems of interest run. In such scenarios, the front-end component establishes a network connection back to the integration tool back-end component. The connection enables the components to remotely communicate and pass data between one another. The connection can also be used by the back-end component to configure and control the front-end component operation.

In preferred embodiments, the front-end component scans the business systems or business network for the bookkeeping or accounting systems of the business. The front-end component can be configured with a list of accounting systems to scan for. This can include scanning for Quickbooks or Sage accounting systems as some examples. The scanning may search for application pathnames, registry entries, file extensions, and other such identifiers that indicate the presence of one or more specific accounting systems within the various business systems.

In response to locating an accounting system on the business systems or network, the front-end component performs an extraction operation. As part of the extraction operation, the front-end component accesses the identified accounting system in order to identify a particular set of business specific information. The access can include identifying specific accounting system files, database files, database records, or accounting system data. Accordingly, the access can differ depending on the accounting system identified by the front-end component on machines or networks of a particular business. In any event, once the particular set of business specific information is identified, the front-end component passes the information to the back-end component. This can include sending a copy of a file, database, database record, or data to the back-end component. This can also include providing the back-end component direct access to the accounting system over the connection established between the front-end component and the back-end component.

Another alternative for initiating business system integration is to allow the business to directly upload the files or databases containing the business specific information to the back-end component. In some such embodiments, the front-end component provides a website to which accounting system files or databases can be uploaded. The business can also provide temporary login credentials so that the back-end component can access secured files or databases.

The back-end component continues the business system integration by opening the files or databases containing the business specific information and extracting certain data items therein if the data items were not already extracted by the front-end component. In preferred embodiments, the back-end component of some embodiments opens business accounting system accounts, files, or databases and searches for data structures storing accounts receivable data. The accounts receivable data include financial transactions the business has had with different entities over time. This can include invoices the business issued to the different entities. The financial transactions include identifying information about the entities engaged in the financial transactions, invoiced amounts, received payments, and dates associated with each of the financial transactions.

The extraction operation is simplified when the files or databases are structured according to a known format. Quickbooks and Sage are examples of accounting systems with accounting information structured to a format that is known or recognized by the back-end component. In such cases, the back-end component is able to identify and directly extract the financial transaction from the accounts receivable data.

The integration tool is configured with matching routines that further allow the back-end component to extract financial transactions or other business specific information provided in an unknown or unrecognized format. In some embodiments, the matching routine involves configuring the back-end component with different dictionaries. The dictionaries enumerate all known business names as well as all possible street addresses, cities, states, zip codes, and telephone numbers. The list of business names can be obtained from business registration filings with different state or city agencies or from a business monitoring or reporting firm.

The matching routine begins by opening an accounting system file or database with an unknown or unrecognized structure. The matching routine attempts to match different fields from the accounting system file or database to one of the dictionaries. The back-end component structures the fields as each field's content is identified with sufficient accuracy by one of the dictionaries. In some embodiments, specialized fields, including those specific to accounts receivable data, may be recognized by using dictionaries with specialized terminology for recognition of the accounts receivable data. In some embodiments, these specialized fields can also be identified based on the relevance or relation between data from two or more adjacent fields. For instance, a date adjacent to a monetary amount can be representative of an invoiced amount or payment amount.

The integration further involves generating an entity table from the accounts receivable data. The back-end component creates a new entity table entry as it identifies new entity identifying information in parsing through the accounts receivable data. The entity identifying information includes different identifiers from which entities the business has engaged with in the past can be identified. The identifiers are typically found within transaction invoicing. The identifiers include entity names, telephone numbers, email addresses, street addresses, tax identification numbers, and social security numbers as some examples.

Each entity table entry represents a different entity. Each entity table entry includes at least one identifier found in the accounts receivable data. A new entity table entry can include multiple different identifiers when the different identifiers identify the same entity or are specified as part of a common transaction or invoice in the accounts receivable data. For example, a particular entity table entry can include the name and street address that are identified for the particular entity from the accounts receivable data.

The back-end component also populates each entity table entry with the financial transactions involving the corresponding entity identified by the entry. This includes extracting invoice amounts, payment amounts, and dates from the accounts receivable data and associating the information to the entity table entry representing the entity that was invoiced and submitted the payments. Based on the extracted data, the entity table is able to track indebtness and payment history of the different entities engaged in the financial transactions with the business.

Figure 3:
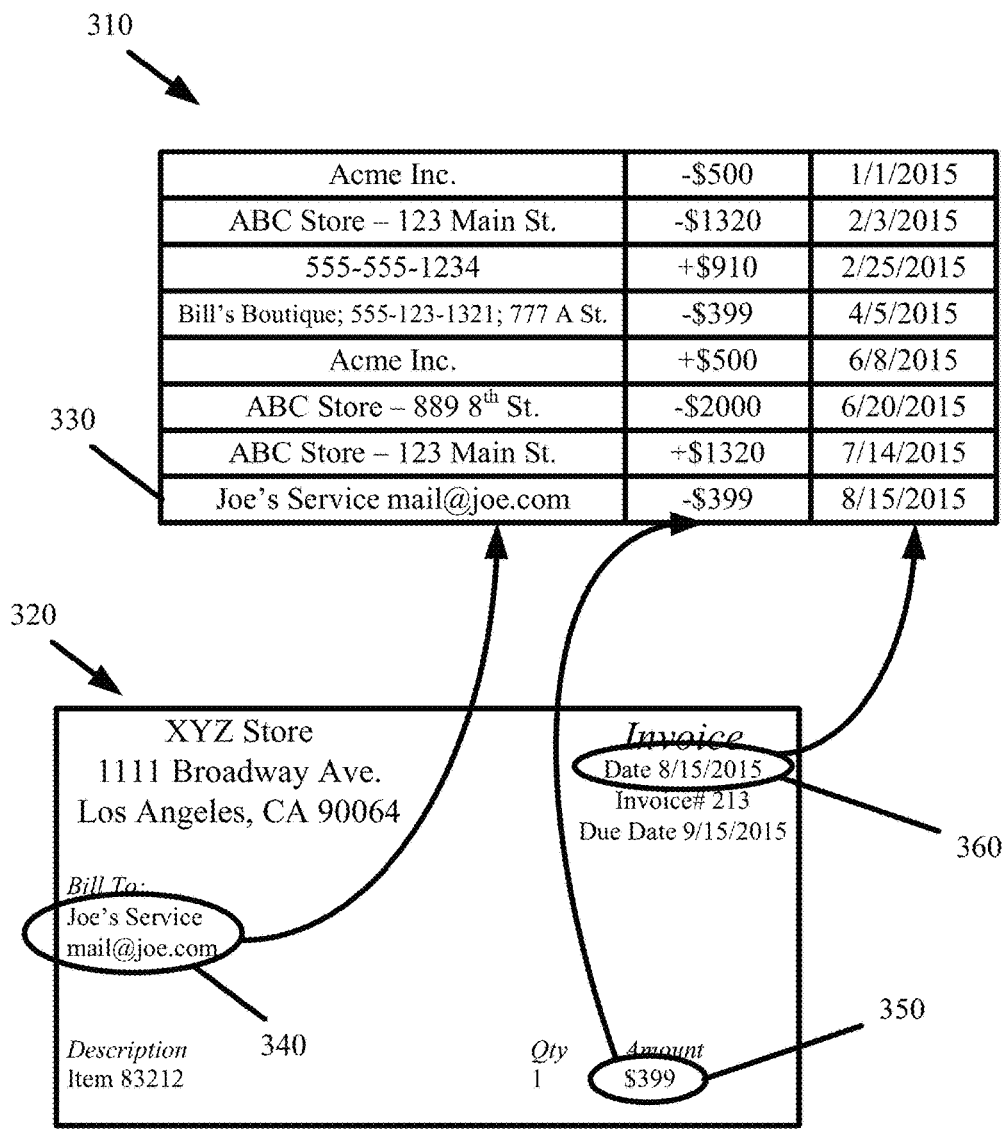
FIG. 3 conceptually illustrates an entity table that the back-end component creates from accounts receivable data extracted from accounting systems of a particular business in accordance with some embodiments.

FIG. 3 conceptually illustrates an entity table 310 that the back-end component creates from accounts receivable data extracted from accounting systems of a particular business in accordance with some embodiments. In particular, the figure illustrates the entity table 310, an exemplary invoice 320, and a financial transaction entry 330 within the entity table 310 that is created based on extracted data from the exemplary invoice 320. The invoice 320 information is contained in the accounts receivable data accessed by the front-end component. The invoice 320 formatting is likely not contained in the data and is presented for illustrative purposes.

The invoice 320 includes a name and email address 340 of the entity being invoiced. This entity identifying information is used to create entity table entry 330. The entry 330 is then populated with one or more of the invoiced amounts and payment amounts (e.g., 350) as well as dates (e.g., 360) associated with each.

The next integration step performed by the integration tool back-end component involves merging the business specific information entered to the entity table with external data. A first merge operation involves uniquely identifying each entity in the entity table. In some embodiments, the first merge operation merges the identifying information for each entity in the entity table to a unique identifier from external systems, wherein the unique identifier can be a Data Universal Numbering System (D-U-N-S) number or Tax Identification Number (TIN) as some examples.

This merge differentiates different entities that may have the same name or other identifiers in common. The merge also combines or correlates entities with different identifying information that are actually the same.

FIG. 4 illustrates an exemplary entity table obtained from accounting systems of a particular business that the back-end component merges with unique D-U-N-S identifiers from an external system in accordance with some embodiments. As shown, two entries 410 and 420 in the entity table specify the same name of "ABC Store", but the two entries 410 and 420, because of other identifying information, are matched to separate entities based on merged information from the external systems. Entries 410 and 420 are therefore assigned different unique identifiers 430 and 440. Entries 410 and 450 in the entity table also specify the same "ABC Store" name and different address identifiers. However, these entities are matched to the same entity based on merged information from the external systems. Entries 410 and 450 are therefore assigned the same unique identifier 430.

To perform the first merge operation, the back-end component queries a database of known businesses with the extracted entity identifying information from each entry of the entity table. The database stores the D-U-N-S numbers for the different known entities. The database queries can be conducted using any of the entity name, telephone number, mailing address, etc. extracted to a given entity table entry.

Once entity identifying information matches with a high degree of probability to a known business in the database, the back-end component merges the unique identifier from the database to the entity table entry. The back-end component processes all financial transaction entries in the entity table until a unique identifier is found for each entry or an entry cannot be matched to a known entity. Unmatched entities can be ignored or removed.

The back-end component then performs a second merge operation. The second merge operation involves merging invoicing and payment data for each uniquely identified entity in the entity table with historic credit data and scores for the uniquely identified entity at the different invoice and payment dates.

To perform the second merge operation, the back-end component accesses a financial transaction entry in the entity table. The back-end component obtains an invoice date or payment date associated with the entry. The back-end component also obtains the unique identifier identifying the entity associated with the entry. The back-end component then obtains historic creditworthiness data for the entity using the merged unique identifier and the date. The creditworthiness data identifies the entity's credit score at each of the invoice and payment dates. In other words, the back-end component merges each particular financial transaction with a credit score of an entity associated with that particular financial transaction at the date associated with the financial transaction. For example, if an invoice includes first and second dates relating to transactions with a particular entity, the second merge operation identifies the particular entity's credit at the first date as well as at the second date. Financial transactions with the same entity can therefore be merged with different credit scores if the financial transaction dates and the entity's credit score differs at those dates.

Figure 5:
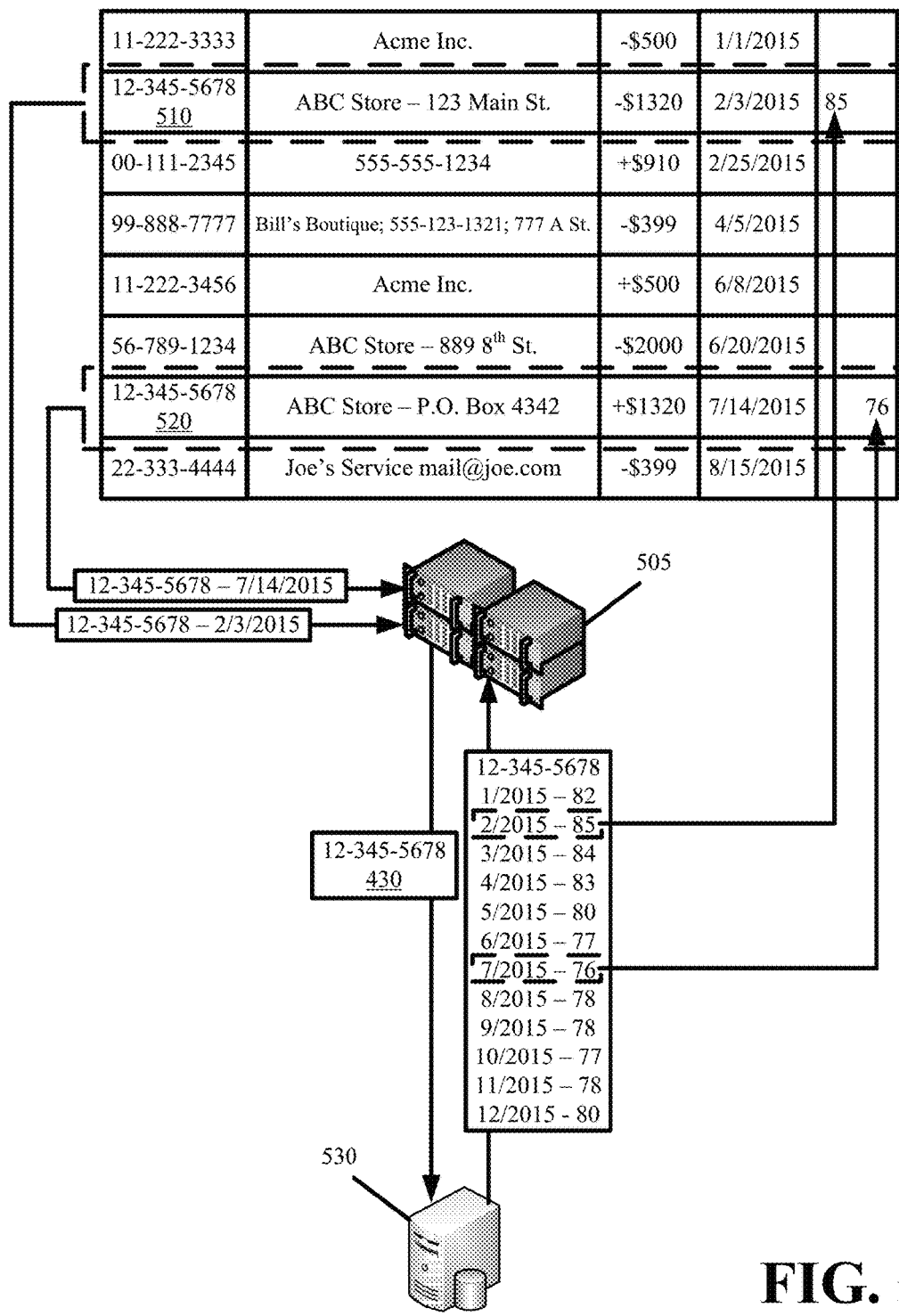
FIG. 5 illustrates the integration tool back-end component merging historic creditworthiness data to an entity table in accordance with some embodiments.

FIG. 5 illustrates the integration tool back-end component 505 merging historic creditworthiness data to an entity table in accordance with some embodiments. The figure illustrates the back-end component 505 merging creditworthiness data for entity table entries 510 and 520 that specify transactions with the same entity at different times.

As shown, the back-end component 505 selects the unique identifier and date from entity table entries 510 and 520. The back-end component 505 obtains historic credit scores for the entity identified in each of the entries 510 and 520 from an external system 530. The credit scores may be Paydex scores when the identified entities are business entities. However, the same technique can be applied in order to populate the entity table with personal credit scores, such as FICO scores, when the identified entities are individuals.

The back-end component 505 then merges the entity's credit score at the date of each entry 510 and 520 to the entity table. The back-end component 505 performs the same merge for each entry in the entity table. The resulting entity table therefore tracks the credit score of different entities throughout the engagement of those entities with a particular business.

In some embodiments, the front-end component maintains access into the business systems to provide a real-time feed to the back-end component. The back-end component can continually update the entity table with the real-time feed. More specifically, as a business engages in new transactions with different entities, the back-end component can lookup the credit data for those entities and compare the credit data to past credit histories of the entities. From the comparison, different actions can be taken to secure the business.

Thusfar, the integration tool has opened access to proprietary business systems and merged those systems with external systems. These foundational steps provide the framework for integrating customized external services as part of the business system operation. The integration therefore further involves generating the external services from the merged data set and embedding the external services to run in connection with or as part of the business's regular operations.

In some embodiments, the external services run on the back-end component and actions, results, alerts, or any other service output are passed in real-time to the business systems via the front-end component. In some embodiments, the external services execute directly as part of the proprietary business systems. In some such embodiments, the back-end component, through the front-end component, embeds the external services to run on computers or machines of the business concurrently running the business systems related to the external services.

The external services secure operations of one or more business systems or businesses integrated with the external services. In preferred embodiments, the external services secure business accounting systems against insecure financial transactions, wherein the insecure financial transactions include transactions that have produced or will produce bad debt, transactions with entities having credit scores below certain thresholds, transactions with entities with excess indebtness or poor payment history, and transactions with terms that violate credit policies specified as part of the external services.

In some embodiments, the external services secure business accounting systems by providing an early warning system for insecure financial transactions. The early warning system introduces security alerts as part of the business accounting systems. The external services issue alerts that notify a business of insecure financial transactions that could have been or should be avoided. The external services can also be integrated into the business accounting systems such that they modify runtime operation of the business accounting systems to issue alerts in response to newly entered insecure financial transactions.

A particular implementation of the early warning system leverages the merged data set to protect a business from bad debt. In this implementation, the external services proceed through each entry of the merged entity table. For each entity, the external services analyze the entity's credit scores relative to the debt owed to the business and payment history at the different dates. The external services then issue alerts that notify a business of bad debt that could have been avoided as well as potential new bad debt that can arise from entities that are likely to stop paying, underpay, or pay late.

Figure 6:
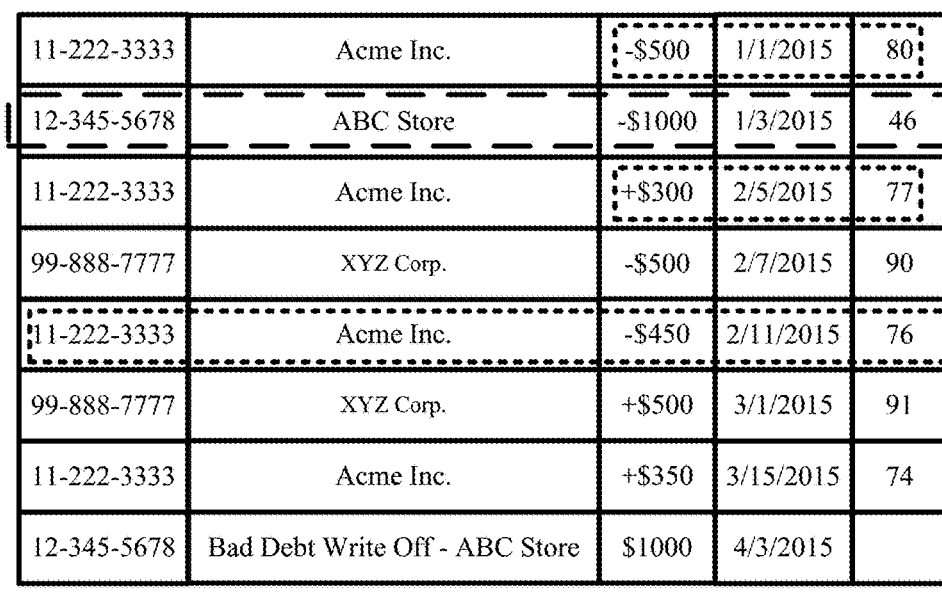
FIG. 6 conceptually illustrates the early warning system for insecure financial transactions in accordance with some embodiments.
Figure 6:
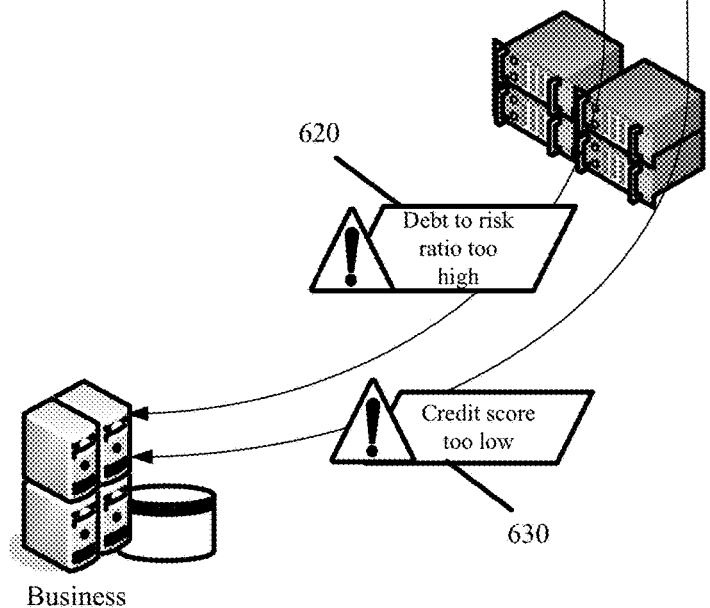

FIG. 6 conceptually illustrates the early warning system for insecure financial transactions in accordance with some embodiments. The figure illustrates an exemplary entity table 610 resulting from the merging of a business accounting system with creditworthiness information from external systems. The figure also illustrates alerts 620 and 630 that are generated in response to two financial transaction entries from the table 610.

The first alert 620 notifies the business of one or more financial transactions with a first entity that have a high likelihood of becoming bad debt. The first alert 620 is generated because of the amount of debt incurred by the first entity relative to the first entity's credit score and the first entity's prior payment history. The payment history has some late payments and underpayments. The amount of debt is also increasing at the same time as the first entity's credit score is falling. In this case, the amount of debt and payment history exceed what is permissible for entities having the first entity's credit score. Accordingly, the first alert provides an early warning to the business that additional credit should not be given to the first entity until the current debt is paid off or brought back under an acceptable amount.

The second alert 630 notifies the business of bad debt that could have been avoided. The external service identifies bad debt or debt that was written off or never paid. The external services then identify historic credit scores for the second entity responsible for the bad debt. At a date prior to the default, the second entity had a credit score that was below an acceptable threshold. Had the early warning system been in place at that time, the business would have been advised by the external services to not incur any more debt from the second entity. Thus, the second alert 630 notifies the business of an amount of bad debt that could have been avoided with the alerts generated from the integration tool embedded external services.

The alerts can be sent to the business over any digital communication medium. The alerts include text messages, telephone voice messages, emails, and web page notifications. Different business representatives can register to receive the alerts. Alternatively, the alerts can be sent directly to one or more business systems. Alerts can also be sent to entities in order to remind them of outstanding debt or invoices that are due or past due.

In some embodiments, the external services secure business operations by preventing the business from entering into insecure financial transactions. In some such embodiments, the embedded external services protect the business against insecure financial transactions by locking the business accounting system so that new financial transactions with entities having credit scores below a minimum threshold, excess indebtness, or poor payment histories in violation of the external services cannot be entered into the accounting system. The external services can also suspend an entity's account within the accounting system until the entity's indebtness is reduced.

To do so, the back-end component generates one or more credit policies that the embedded external services enforce during runtime operation of the accounting system. The external services enforce the credit policies against new financial transactions that are to be entered into the accounting systems. The credit policies validate the financial transactions and control whether the business or business representative can enter into transactions with different entities.

In some embodiments, the back-end component automatically generates the credit policies based on existing risk within the merged entity table. The risk assessment performed by the back-end component is based on the credit scores, outstanding debt, and payment histories of the entities identified in the entity table. These measures collectively determine the total risk facing the business and are further used to gauge how much additional risk the business can incur collectively and on a per entity basis. For instance, a first business may transact with entities that have large amounts of outstanding debt but exceptional credit scores and payment histories. Accordingly, the overall risk to the first business may be low because the entities are very likely to pay off the debt. The first business can continue conducting business with the entity, although the amount of additional debt that the entities can incur may be restricted. Alternatively, a second business may transact with entities that have small amounts of outstanding debt but poor credit scores and payment histories. The second business may be subject to greater risk than the first business because the entities that the second business transacts with have a higher propensity to default. The external service may prevent the second business from further transactions with the entities in order to prevent the potential for larger writeoffs of bad debt and to keep the entities within acceptable parameters.

In view of the foregoing, the back-end component may generate more restrictive credit policies when there is a large amount of risk within the accounts receivable data of a business and may generate less restrictive credit policies when there is a lesser amount of risk within the accounts receivable data. The credit policies can also be defined or tuned according to a risk tolerance that is acceptable to the business based on business provided criteria. The credit policies can also be tuned on an individual entity business basis, whereby entities with little debt, good credit scores, and good payment histories can engage in transaction in which they receive better payment terms, more credit (i.e., pay less upfront), or can enter in larger transactions with the business. Conversely, entities with large debt, poor credit scores, and poor payment histories may be restricted from further transacting with the business or may receive shorter payment terms or may be required to provide larger upfront deposits or payments.

As noted above, enforcement of the credit policies during runtime operation of the accounting system can prevent entry of insecure financial transactions into the accounting system or can modify terms of the insecure financial transaction that are in violation of the credit policy or external service with modified terms that comply with the credit policy or external service. In some such embodiments, the external services modify operation of the accounting system by automatically qualifying financial transactions in compliance with the credit policies and by automatically disqualifying insecure financial transactions in violation of the credit policies. The external service can thereby restrict how much credit the business can extend to an entity based on risk associated with the entity as determined from the merged data set.

Figure 7:
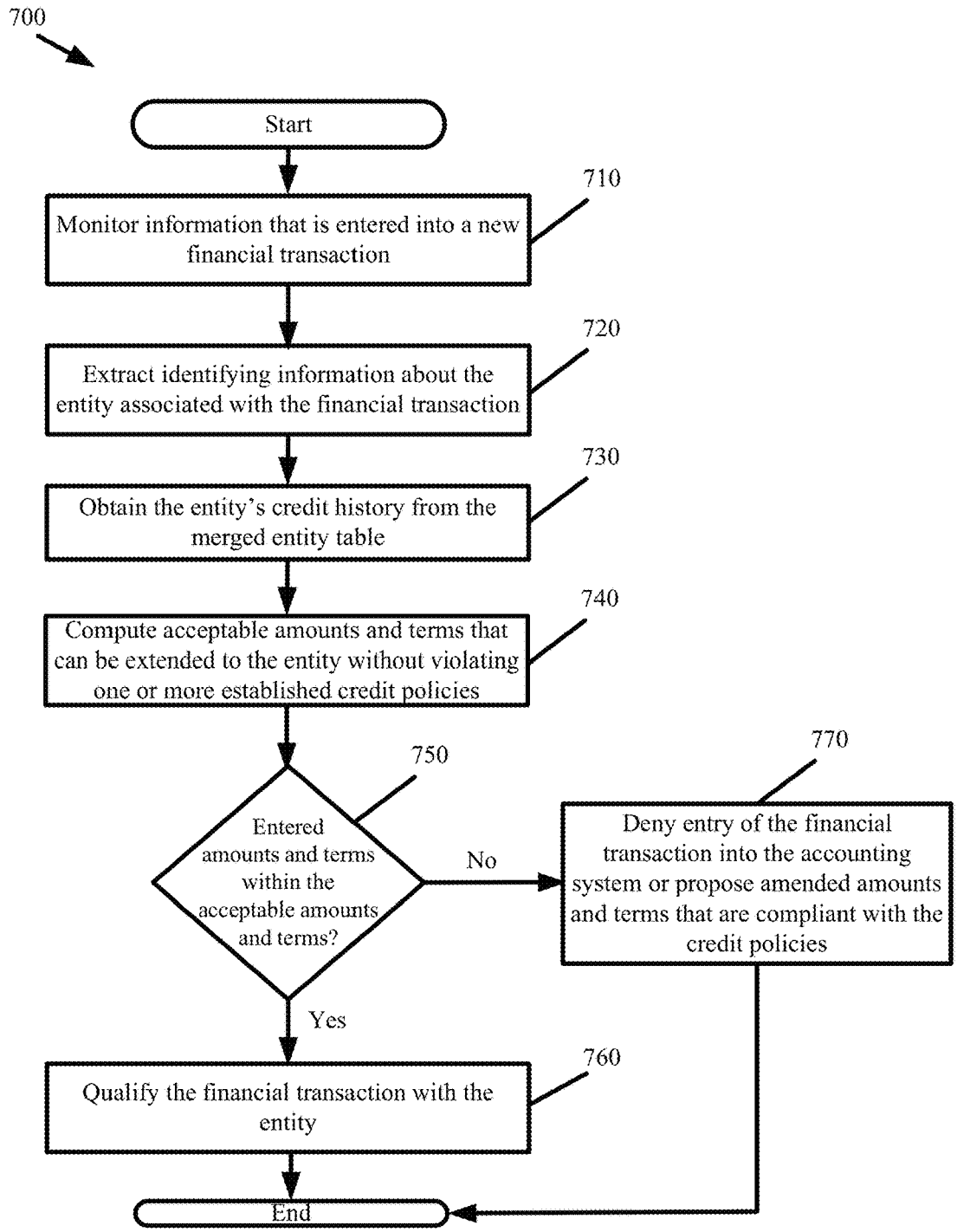
FIG. 7 presents a process for automatically qualifying or disqualifying transactions based on credit policies the integration tool of some embodiments integrates as part of business system operation.

FIG. 7 presents a process 700 for automatically qualifying or disqualifying transactions based on credit policies the integration tool of some embodiments integrates as part of business system operation. The process 700 commences in response to creation of a new financial transaction. The process monitors (at 710) the financial transaction information. As the financial transaction is populated, the process extracts (at 720) identifying information about the entity associated with the financial transaction. The process obtains (at 730) the entity's credit history from the merged entity table. This includes past debt, payment history, and entity credit scores. From the entity credit history, the process computes (at 740) acceptable amounts and terms that can be extended to the entity without violating one or more established credit policies. The process then determines (at 750) whether the amounts and terms entered as part of the financial transaction are within the acceptable amounts and terms.

Should the entered amounts and terms fall within the acceptable amounts and terms, the process qualifies (at 760) the financial transaction with the entity and allows the financial transaction to be entered to the accounting system. However, should the entered amounts and terms violate the acceptable amounts and terms, the process either denies (at 770) the financial transaction or proposes amended amounts and terms that would be acceptable in view of the established credit policies. For example, a business representative may create an invoice in the integrated business accounting system and populate the invoice with 60 day payment terms for a particular entity. The external services modify the payment terms from 60 days to 30 days because of the invoiced entity's credit history as identified in the merged entity table. As another example, the external services can amend or disqualify a transaction in which a deposit for goods or services is too low based on the amount of debt and payment history of the transactional entity. The external services can factor in an entity's credit score, previous payment history, timeliness of payments, outstanding debt, litigation, and bankruptcies from the merged data set in automatically qualifying or disqualifying an entity or a transaction with an entity.

Process 700 has been described with respect to qualifying and disqualifying transactions with different entities. However, the credit policies can also be applied to qualify and disqualify entities as transactional partners. In such cases, the credit policies can prohibit engagement with a particular entity having a credit score that falls below an acceptable threshold, an unacceptable payment history, or too much outstanding debt. More specifically, the business can prevent sale of goods and services to disqualified entities.

The external services can enforce the same credit policies against an entity that is a new business client. In such cases, the entity identifying information is extracted from the invoice and passed to the back-end component. The back-end component matches the identifying information to a unique entity identifier from which that entity's credit score can be obtained from an external system. The transaction can then be qualified or disqualified based on whether the entity's credit score satisfies a minimum credit score threshold.

In some embodiments, the external services and the qualification or disqualification result can be incorporated into other business systems. For example, the shipping department of a business may receive an order from an entity, but the external services may flag the order as a disqualified one, thereby prohibiting personnel in the department from packaging or shipping a good or service to the entity. As another example, the external services may be integrated with service accounts of a business through which customers obtain access to various business provided services. If the external services disqualify an entity or entity transaction, then the integration with the service accounts can block or prevent the entity from logging into an account from which they can access services of the business. In other words, the external services can automatically block customer accounts when the accessing entity has been disqualified because of enforcement of the credit policies. In summary, the external services can integrate with other business systems and in so doing, guard or prevent entity access to these systems when the entity is disqualified due to enforcement of the credit policies.

Risk averse businesses can manually adjust the credit policies to reduce amounts of outstanding debt per entity, to shorten payment terms, and increase the minimum credit score for entities transacting with the business. Conversely, risk tolerant business can manually adjust the credit policies to allow for greater amounts of outstanding debt per entity, to lengthen payment terms, and decrease the minimum credit score for entities transacting with the business.

A necessary but undesired ramification of the transaction disqualification performed by the integration tool of some embodiments is the potential for disrupting business operations. The credit policy enforcement can cut off certain entities from engaging a business in further transactions or limit future transactions between the business and those entities. To offset any such disruption while continuing to enforce the credit policies and secure the business from bad debt, some embodiments generate replacement referrals that can be used as substitutes for entities subject to the credit policy enforcement.

The integration tool identifies a replacement referral when a first entity transacting with a business secured by the integration tool is subject to enforcement of a credit policy. The integration tool obtains identifying information about the first entity including for example a geographic region and a Standard Industrial Classification (SIC) or North American Industry Classification System (NAICS) code. Using the identifying information, the integration tool searches entity databases to identify at least a second entity operating in the same industry as the first entity, but having superior credit than the first entity. For example, the business may have transactions with a first reseller of the particular goods provided by the business. Over time, the first reseller increases its debt, has late payments, and experiences a decrease in its credit score past a threshold such that continued dealings with the first reseller subjects the business to increased risk of default from the first reseller and violates a credit policy enforced by the integration tool of some embodiments. Accordingly, the integration tool identifies a second reseller also reselling the particular goods but having less outstanding debt, a better payment history, and a higher credit score than the first reseller. The integration tool refers the second reseller to the business and encourages the business to replace the first reseller with the second reseller.

Some embodiments of the integration tool avoid business disruption through alternative means including preempting the disruption through expanded outreach to the entities that are subject to the credit policy enforcement. From access to the accounting systems of one or more businesses, the back-end component identifies a particular entity with a declining credit score, increasing debt, or increasing number of late payments that will eventually be subjected to credit policy enforcement with the integration tool either preventing the business from further transacting with the particular entity or transacting subject to more restrictive terms. In such cases, the back-end component of the integration tool obtains contact information for the particular entity from the extracted business specific information. The back-end component then alerts the particular entity using the contact information. The alert notifies the particular entity of negative changes to its credit and ramifications of those changes with respect to businesses it transacts with. The notification can directly identify changes such as shorter payment terms, larger deposit requirements, debt ceilings, or being blocked from future transaction with a particular business as some examples. The alert provides the particular entity with early warning and an opportunity to cure the negative changes in order to prevent disruption resulting from back-end component credit policy enforcement at businesses the particular entity transacts with. In some embodiments, the alert further instructs the particular entity on actions that it can take to avoid becoming subjected to the credit policies enforced by the integration tool for one or more businesses.

In some embodiments, the integration tool and the business system integration provided by the integration tool are leveraged to enhance credit reporting. In the past, credit reporting agencies depended on trade references and a very select set of large merchants to evidence payment history, payment timeliness, and other financial risk factors of different entities. The problem with this approach is that savvy entities can game the system to maintain or improve their credit score while not paying their debts in a full and timely fashion. To game the system, the entity would identify the trade references and merchants reporting to the credit agencies and ensure timely and full debt payment to those entities. Meanwhile, the same entity would defer or not pay debts owed to other entities that do not report to the credit reporting agencies. The entity's credit score would remain unchanged or would even increase despite the entity not paying its debts in full or on time.

The integration tool and business system integration provided by the integration tool prevent such credit score gaming. The integration tool integration allows any business, big or small, to essentially become a trade reference and provide accurate invoice and payment information about the various entities it interacts with to one or more credit reporting agencies. Moreover, the reporting occurs automatically without any effort or action on behalf of the business. The integration tool simply forwards the invoice and payment specific data it obtains from the business accounting systems to the one or more credit reporting agencies. Credit pertinent information, such as outstanding debt and payment history, can be sent in real-time as new information is entered to the business systems and extracted by the integration tool. Alternatively, the integration tool can compile the pertinent information for a single entity from one or more integrated business systems before sending the pertinent information to a credit reporting agency.

The integration tool and business system integration provided by the integration tool can be further leveraged to perform credit report verification and automated dispute resolution. In particular, the integration tool can be used to contest and immediately verify trade reference data that is reported to different credit reporting agencies and included in the credit reports and credit risk assessment of different entities.

Figure 8:
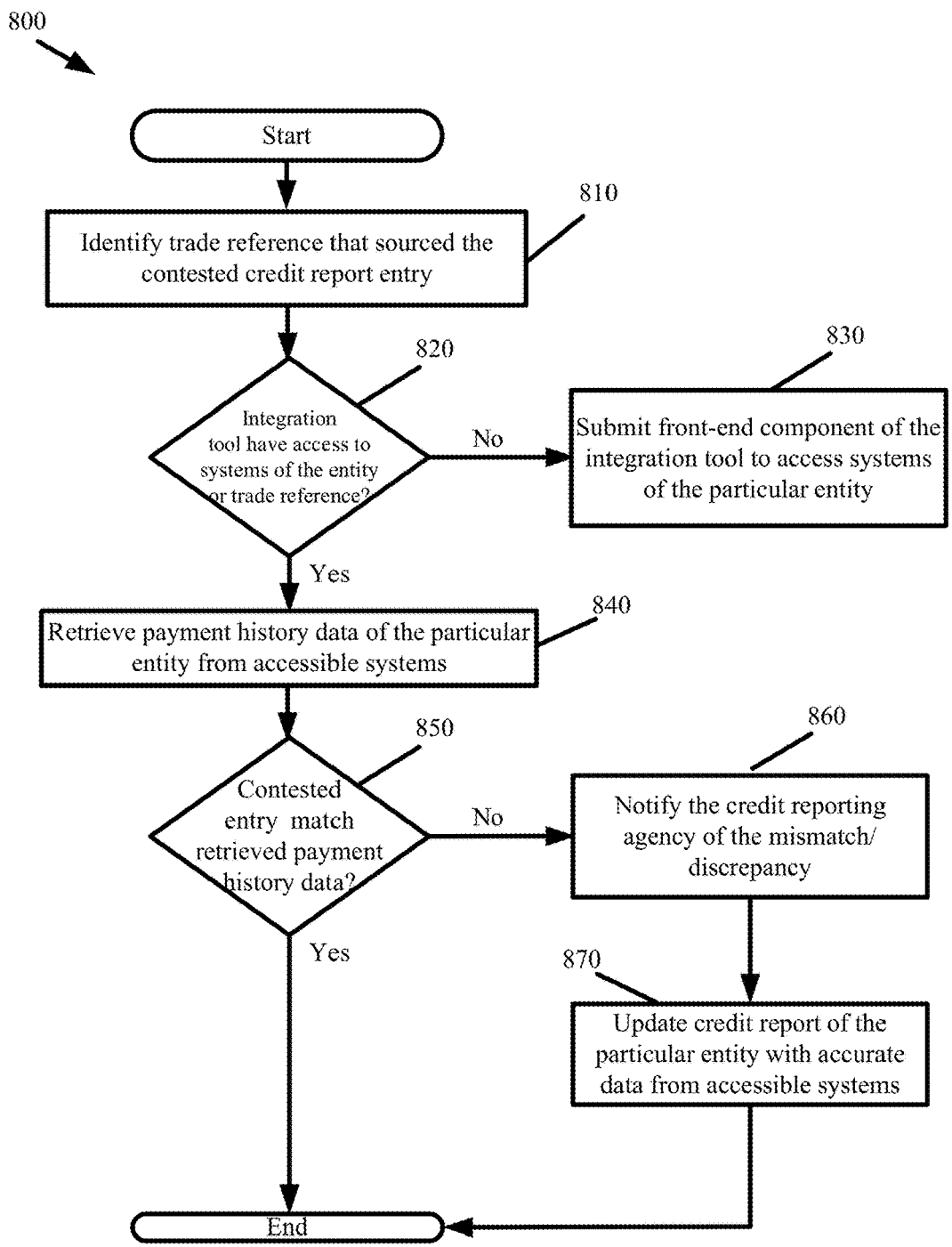
FIG. 8 presents a process for performing automated credit report verification using the integration tool of some embodiments

FIG. 8 presents a process 800 for performing automated credit report verification using the integration tool of some embodiments. Process 800 can be performed with an integration tool having access to and running on accounting systems of a particular entity contesting one or more entries in its credit report. Process 800 can also be performed on accounting systems of a trade reference that submitted the one or more contested entries from the particular entity's credit report to a credit report agency.

The process commences in response to the particular entity contesting a credit report entry. The particular entity can access a website provided by the back-end component to request verification of the contested entry. Alternatively, the particular entity may submit the contested entry to the credit reporting agency. The credit reporting agency communicates the contested entry to the back-end component of the integration tool which trigger process 800 for resolution of the contested entry. Examples of credit report entries that can be contested and verified through process 800 include reported late payments, missed payments, debt totals, and other payment related information.

The process identifies (at 810) the particular trade reference that sourced the entry that is the subject of the dispute. Identification of the particular trade reference can be obtained from the credit reporting agency or can be identified based a list of transactional partners of the particular entity. The process determines (at 820) if the integration tool is integrated on at least one of the particular entity's own systems or the particular trade reference's systems. The determination is conducted based on whether the back-end component of the integration tool has access to accounting systems of either the particular entity or the particular trade reference.

In response to not having access to either entity's systems, the process submits (at 830) the front-end component of the integration tool to the particular entity. The particular entity installs the front-end component on its systems, thereby granting the back-end component access to the accounting systems of the particular entity and the business specific information therein. At this stage, the dispute verification occurs entirely in an automated manner without further involvement by the particular entity.

Once access is obtained through new or existing instance of the front-end component, the process retrieves (at 840) payment history data of the particular entity relative to the particular trade reference from the accessible systems. The retrieved data can either include payments submitted by the particular entity to the particular trade references or payments received by the particular trade reference from the particular entity depending on which system the integration tool has access to.

The process determines (at 850) whether the contested entry in the credit report matches information retrieved from the accessible accounting systems. If the data matches, there is no change, the process optionally informs the particular entity that the entry has been verified, and the process ends. If the data is mismatched, the process directly notifies (at 860) the credit reporting agency of the issue and provides evidence from the accessed accounting systems in order to update (at 870) and correct the credit report of the particular entity.

Server, computer, and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

Figure 9:
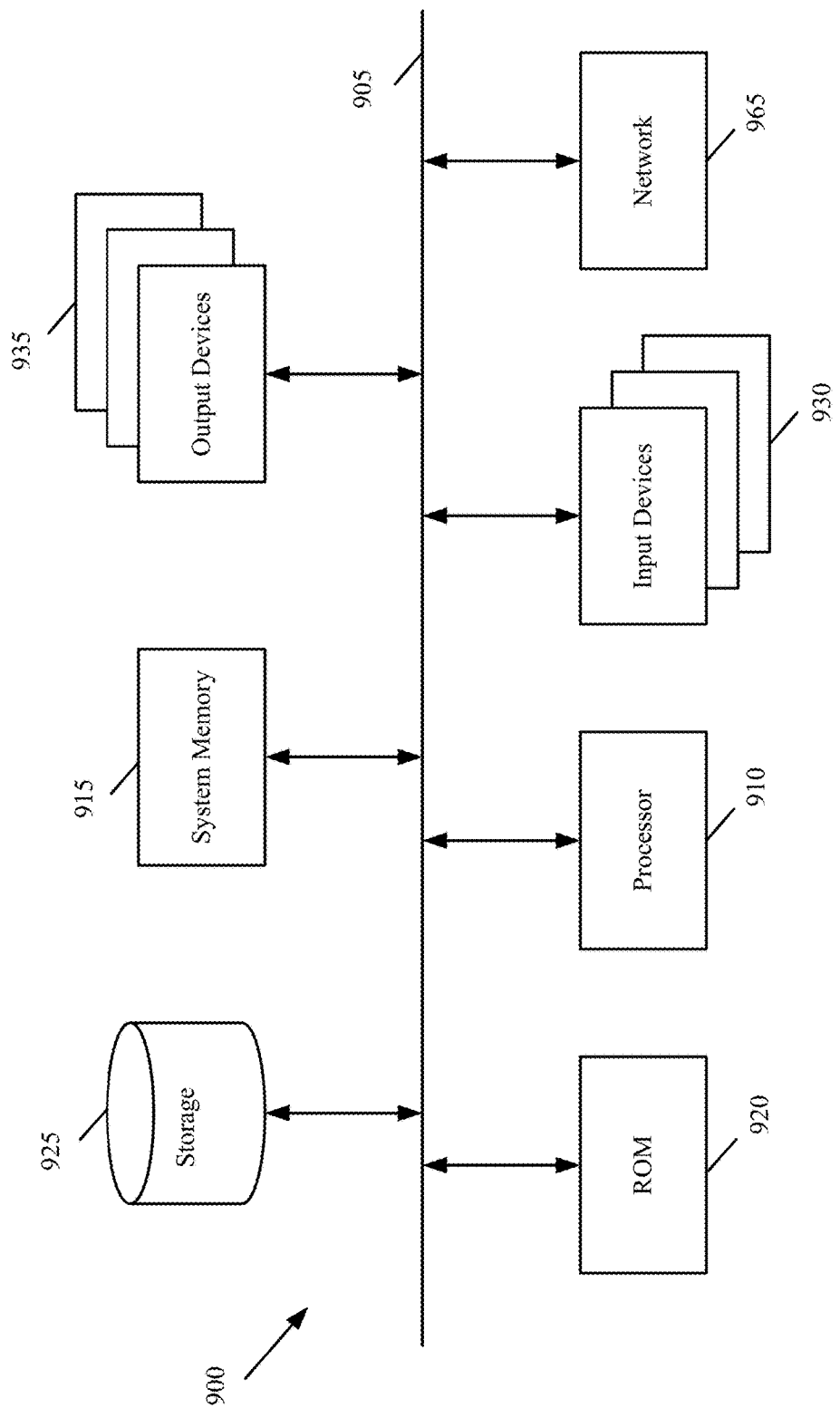
FIG. 9 illustrates a computer system with which some embodiments are implemented.

FIG. 9 illustrates a computer system with which some embodiments of the customized card generation system and its components are implemented. Such a computer system includes various types of computer-readable mediums and interfaces for various other types of computer-readable mediums that implement the various processes, modules, and systems described above. Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike the storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include any of a capacitive touchscreen, resistive touchscreen, any other touchscreen technology, a trackpad that is part of the computing system 900 or attached as a peripheral, a set of touch sensitive buttons or touch sensitive keys that are used to provide inputs to the computing system 900, or any other touch sensing hardware that detects multiple touches and that is coupled to the computing system 900 or is attached as a peripheral. The input devices 930 also include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers such as a local area network ("LAN"), a wide area network ("WAN"), or an Intranet, or a network of networks, such as the internet. For example, the computer 900 may be coupled to a web server (network 965) so that a web browser executing on the computer 900 can interact with the web server as a user interacts with a GUI that operates in the web browser.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A system comprising:
   an accounting system of a business running on a first machine under control of said business;
   a system integration tool providing an external service running in conjunction with the accounting system of the business, the system integration tool comprising:
      a front-end component configured to remotely access accounts receivable data from the accounting system over a digital network, the accounts receivable data comprising a plurality of prior financial transactions, a plurality of entities associated with the plurality of financial transactions, and a plurality of dates associated with the plurality of transactions;
      a back-end component comprising a processor and a network interface communicably coupled to the front-end component, the back-end component comprising a program memory including instructions configured to, when executed on a second machine separate from the first machine, at least:
         generate a computer-executable service from merging each particular financial transaction of the plurality of prior financial transactions with a historic credit score of an entity at the date of the particular prior financial transaction, wherein the entity is a business or individual having engaged in the particular financial transaction with the business, such that each of the plurality of prior financial transactions for the entity is merged with each of the respective historic credit scores for each of the respective dates of the respective plurality of prior financial transactions;

embed, through access provided by the front-end component, the computer-executable service as part of the accounting system; and wherein the accounting system, in response to said embedding, is configured to protect the business against insecure financial transactions violating said computer-executable service by locking said accounting system from user entry of a first set of the insecure financial transactions while entering secure financial transactions in the accounting system.

2. The system of claim 1, wherein said embedding modifies runtime operation of the accounting system by issuing an alert from the service in response to an insecure financial transaction violating said service.

3. The system of claim 1 further comprising at least one external system communicably coupled to the back-end component, the at least one external system storing credit scores for different entities at different times.

4. The system of claim 1, wherein embedding the computer-executable service is configured to enforce at least one credit policy with the financial transactions entered to the accounting system.

5. The system of claim 1, wherein the accounting system is further configured to protects protect the business by locking the accounting system from user entry of a second set of the insecure financial transactions associated with an entity having an insufficient credit score, excessive debt, or a threshold number of late payments.

6. The system of claim 1, wherein executing by the back-end component is further configured to execute program instructions comprising: extracting payment history of the plurality of entities from the plurality of financial transactions.

7. The system of claim 6 further comprising a credit reporting system configured to receive said payment history from the plurality of financial transactions and including the payment history in adjusting credit scores of the plurality of entities.

8. A method comprising:

remotely accessing accounts receivable data from an accounting system of a business, the accounts receivable data comprising a plurality of prior financial transactions, a plurality of entities associated with the plurality of financial transactions, and a plurality of dates associated with the plurality of transactions;

retrieving, for each financial transaction of the plurality of transactions, a date at which the financial transaction occurred and a credit score of an entity from the plurality of entities involved in the financial transaction at the date at which the financial transaction occurred;

merging each particular prior financial transaction of the plurality of financial transactions with the credit score of the entity involved in the particular prior financial transaction at the date at which the particular financial transaction occurred;

generating an external service based on said merging;

integrating the external service with the accounting system, wherein said integration introduces security configured to protect the accounting system based on violation of said external service as a result of a new insecure financial transaction involving a particular entity being entered to the accounting system and historic debt and credit scores of the particular entity as identified from said merging and a set of previous financial transactions from the plurality of financial transactions involving the particular entity; and enforcing the external service during runtime operation of the accounting system, wherein said enforcing comprises preventing entry of an insecure financial transaction into the accounting system.

9. The method of claim 8 further comprising merging each different entity associated with one or more financial transactions from the plurality of financial transactions with a different unique entity identifier.

10. The method of claim 9, wherein the unique entity identifier is a Data Universal Numbering System (D-U-N-S) number.

11. The method of claim 8 further comprising issuing an alert to the business as a result of said violation by the new insecure financial transaction.

12. The method of claim 8, wherein said security protection integration introduces security alerts as part of the accounting system, the security alerts generating and sending one of an email, text message, or web page notification based on violation of said external service.

13. The method of claim 8, wherein said enforcing further comprises modifying terms of the insecure financial transaction in violation of the external service with modified terms complying with the external service.

14. The method of claim 8, wherein said integrating comprises running the external system on a machine running said accounting system.

15. The method of claim 8 further comprising modifying operation of the accounting system with the external service, wherein said modifying comprises preventing entry of a financial transaction into the accounting system and issuing a security alert to the business in response to the external service identifying the financial transaction as insecure.

16. The method of claim 8 further comprising alerting the business as to an insecure financial transaction from the plurality of financial transactions based on the external service tracking a credit score of an entity associated with the insecure financial transaction at a date of the financial transaction being below a threshold amount.

17. The method of claim 8 further comprising alerting the business as to an insecure financial transaction from the plurality of financial transactions based on total debt and payment history of an entity associated with the insecure financial transaction at a date of the financial transaction.

18. A method comprising:

providing a front-end component to run in conjunction with an accounting system of a business;

receiving over the Internet from the front-end component at a back-end component, access to accounts receivable data from the accounting system, wherein the accounts receivable data comprises a plurality of prior financial transactions, a plurality of entities associated with each of the plurality of financial transactions, and a plurality of dates associated with each of the plurality of transactions, the back-end component comprising a microprocessor and memory, wherein the microprocessor:

extracting from the plurality of financial transactions, a subset of financial transactions with a particular entity at a plurality of different dates;

retrieving credit scores of the particular entity at each date of the different dates of the subset of financial transactions;

producing a table with a plurality of entries, each entry of the plurality of entries comprising a different prior financial transaction from the subset of financial transactions involving the particular entity merged with the credit score of the particular entity at the date of the prior financial transaction;

generating an external service based on said table;

integrating the external service into the accounting system based on access to the accounting system provided by the front-end component, wherein said integration introduces security configured to protect the accounting system in response to user entry of an insecure financial transaction into the accounting system in violation of said external service;

enforcing the external service during runtime operation of the accounting system, wherein said enforcing comprises preventing entry of an insecure financial transaction into the accounting system.

19. The method of claim 18, wherein the back-end component microprocessor further extracts payment history of the plurality of entities from the plurality of financial transactions, wherein said payment history tracks indebtedness of the plurality of entities to the business and timeliness of payments from the plurality of entities to the business.

20. The method of claim 19, wherein the back-end component microprocessor further generates the external services based on the payment history.

21. The method of claim 18, wherein said security protection integration introduces security alerts as part of runtime operation of the accounting system, the security alerts generating and sending one of an email, text message, or web page notification.

* * * * *